United States Patent [19]

Fujimori et al.

[11] Patent Number: 4,592,327

[45] Date of Patent: Jun. 3, 1986

[54] APPARATUS FOR CONTROLLING FUEL INJECTION ADVANCE ANGLE OF A FUEL INJECTION PUMP

[75] Inventors: Kyoichi Fujimori; Takeo Ichikawa, both of Higashimatsuyama, Japan

[73] Assignee: Diesel Kiki Co., Ltd., Japan

[21] Appl. No.: 613,956

[22] Filed: May 24, 1984

[30] Foreign Application Priority Data

May 24, 1983 [JP] Japan .................. 58-90010

[51] Int. Cl.⁴ .......................... F02M 59/20
[52] U.S. Cl. ................. 123/502; 123/198 D
[58] Field of Search ............ 123/501, 502, 357, 359, 123/198 D

[56] References Cited

U.S. PATENT DOCUMENTS

| 4,265,200 | 5/1981 | Wessel et al. | 123/501 |
| 4,342,302 | 8/1982 | Streubel et al. | 123/502 |
| 4,395,905 | 8/1983 | Fujimori et al. | 123/502 |
| 4,428,346 | 1/1984 | Hoshi | 123/501 |
| 4,470,397 | 9/1984 | Brotherston | 123/501 |

FOREIGN PATENT DOCUMENTS

| 134119 | 11/1978 | Japan | 123/502 |
| 54959 | 5/1981 | Japan | 123/502 |
| 333 | 1/1982 | Japan | 123/502 |

Primary Examiner—Magdalen Y. C. Moy
Attorney, Agent, or Firm—Guy W. Shoup

[57] ABSTRACT

In an apparatus for controlling the fuel injection advance angle of a fuel injection pump having a hydraulic type timer with a solenoid valve, the apparatus has a closed-loop control system in which the solenoid valve is controlled so as to be closed or opened in accordance with a first control signal produced in response to a feedback signal showing the actual injection advance angle so that the actual injection advance angle is made to coincide with a desired target injection advance angle when the feedback signal is in a predetermined condition, and the solenoid valve is controlled by a second control signal in the open-loop control mode so as to be continuously closed/opened whereby to regulate the average opening degree of the solenoid valve in order to obtain the optimum injection advance angle when the feedback signal is not in the predetermined normal condition.

10 Claims, 1 Drawing Figure

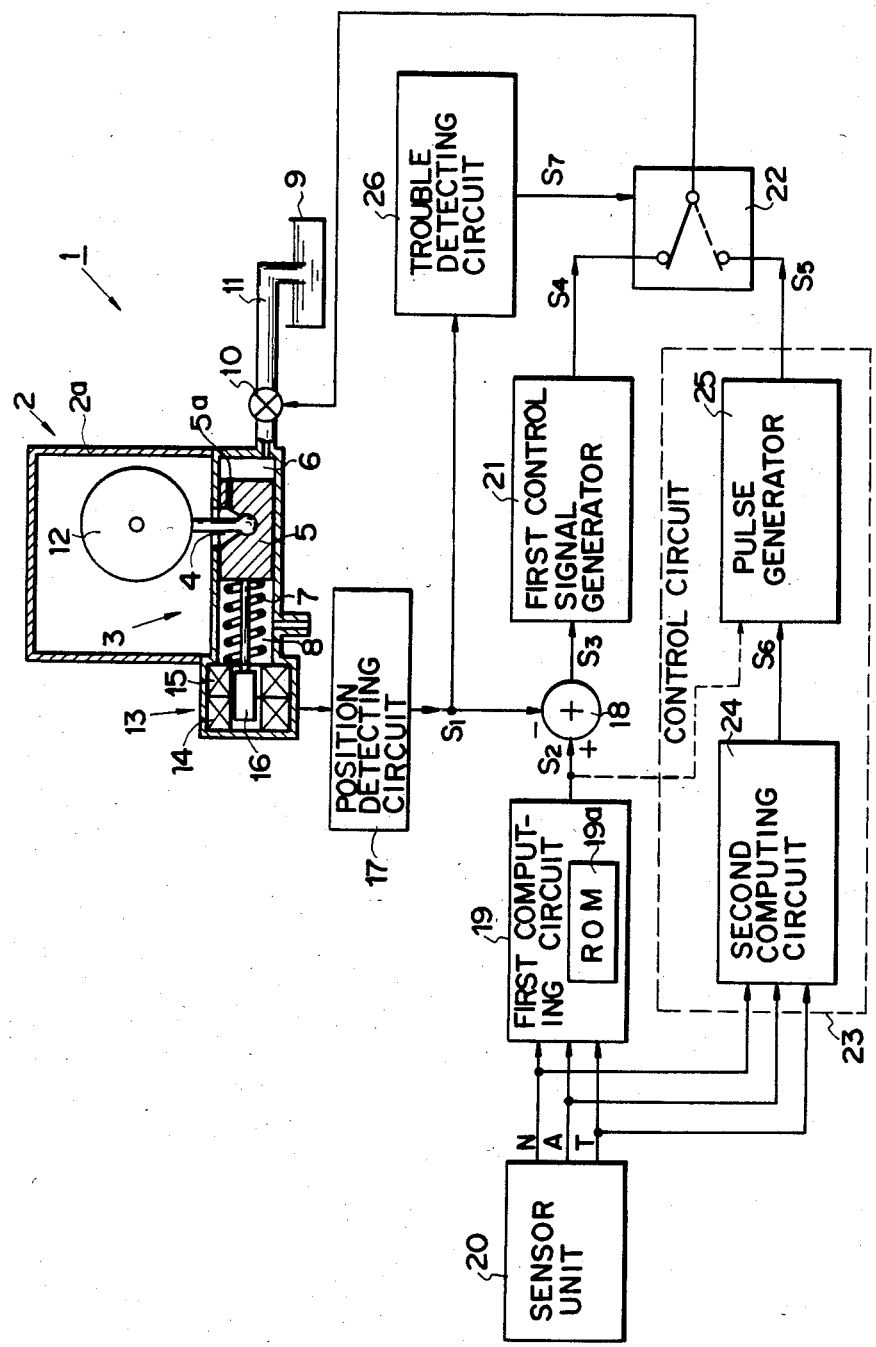

APPARATUS FOR CONTROLLING FUEL INJECTION ADVANCE ANGLE OF A FUEL INJECTION PUMP

BACKGROUND OF THE INVENTION

The present invention relates to an apparatus for controlling the fuel injection advance angle of a fuel injection pump.

In order to electronically control the timing of the supply of fuel to an internal combustion engine in accordance with the condition of the operation of the internal combustion engine, there have been proposed various kinds of apparatuses for controlling fuel injection advance angle. In one widely used conventional apparatus for controlling fuel injection advance angle there is employed a hydraulic type timer composed of a timer piston and a solenoid valve. In this apparatus, the solenoid valve is continuously closed/opened in response to a pulse signal so as to regulate the hydraulic pressure applied to the timer piston. Changes in the duty cycle of the pulse signal cause changes in the average opening degree of the solenoid valve, whereby the position of a member for adjusting the fuel injection advance angle of a fuel injection pump, which is connected with the timer piston, is controlled. Such an apparatus is disclosed, for example, in Japanese Patent Application Publication Nos. Sho 56-52530 and Sho 58-74836.

However, since the solenoid valve is always kept in a state of being repeatedly closed/opened by the application of the pulse signal at a frequency of some 10 Hz in this conventional apparatus, there are disadvantages that the service life of the solenoid valve is short and the reliability of the operation is low. Furthermore, when an expensive solenoid valve with excellent durability is employed in order to obtain a long service life and to increase the reliability of the device, it is disadvantageous in that the manufacturing cost increases.

SUMMARY OF THE INVENTION

An object of the present invention is to provide a highly reliable apparatus for controlling fuel injection advance angle in which it is possible to make the service life of the solenoid valve longer without imparing the control performance of the hydraulic type timer using a solenoid valve.

According to the present invention, in an apparatus for controlling the fuel injection advance angle of a fuel injection pump in which there is provided a hydraulic type timer with a solenoid valve connected with a member for adjusting the advance angle of a fuel injection pump and the advance angle of the fuel injected from the fuel injection pump into an internal combustion engine is controlled by the solenoid valve, the apparatus comprises means for generating a first signal showing a target injection advance angle for closed-loop control according to the condition of operation of the internal combustion engine; means for generating a feedback signal related to the actual injection advance angle; means responsive to the first signal and the feedback signal for producing a first control signal for controlling the solenoid valve so as to be closed or opened so that the actual injection advance angle is made to coincide with the desired target injection advance angle; means for generating a second signal showing a target injection advance angle for open-loop control according to the condition of operation of the internal combustion engine; means responsive to the first signal for generating a second control signal for controlling the average opening degree of the solenoid valve so as to obtain the optimum injection advance angle, the second control signal being a pulse signal whose duty cycle changes in accordance with the first signal; a detecting means for detecting whether or not the feedback signal is in normal condition; and a signal change-over means which is responsive to the result detected by the detecting means and supplies the first control signal to the solenoid valve when the feedback signal is in a predetermined normal condition and supplies the second control signal to the solenoid valve when the feedback signal is not in the normal condition.

With this construction, the solenoid valve is controlled so as to be closed or opened in accordance with the result of the comparison of the target injection advance angle and the actual injection advance angle in the closed-loop control system when the feedback signal is in normal state, whereas the solenoid valve is repeatedly closed/opened at short time intervals to control the average opening degree of the solenoid valve of the hydraulic type timer in accordance with the duty cycle of the pulse signal only when the feedback signal goes out of the normal state. As a result, it is possible to prolong the service life of the solenoid valve.

More specifically, the solenoid valve is controlled so as to be closed or opened in response to the first control signal in the mode of closed-loop control when the feedback signal is normal, and, when it is abnormal, the signal change-over means operates to switch the control system to open-loop control mode in which the solenoid valve is repeatedly opened/closed at predetermined time intervals in accordance with the pulse signal constituting the second control signal. Therefore, in the normal state, the solenoid valve is operated in ON/OFF control mode to close or open only when the sign of the difference between the target injection advance angle and the actual injection advance angle changes. Thus the number of operations of the solenoid valve is remarkably reduced as compared with operation in open-loop control mode and the service life of the solenoid valve is prolonged. On the other hand, if longer service life is not required, an inexpensive solenoid valve can be used to realize a remarkable reduction in the manufacturing cost.

When the state of the feedback signal becomes undesirable, the control system is changed to the open-loop control mode and the solenoid valve is repeatedly closed/opened at short time intervals. However, the closed/opened control state is carried out only for a short period, i.e., only so long as the state of the feedback signal remains undesirable, so that it has no serious effect on the service life of the solenoid valve.

In an embodiment described hereinafter, a signal indicating the position of a timer piston of a hydraulic type timer is employed as the feedback signal used in closed-loop control operation. However, a signal indicating the beginning of fuel injection, a signal indicating the beginning of the burning of fuel or the like can also be used as the feedback signal.

Furthermore, the respective control circuits need not be constructed by the use of discrete components, but the apparatus of the present invention can also be realized by the use of a microcomputer in which the input data are processed in accordance with a predetermined control program.

The invention will be better understood and the other objects and advantages thereof will be more apparent from the following detailed description of a preferred embodiment with reference to the accompanying drawing.

BRIEF DESCRIPTION OF THE DRAWING

The single FIGURE is a block diagram of an embodiment of the present invention.

DESCRIPTION OF THE PREFERRED EMBODIMENTS

The single FIGURE is a block diagram of an embodiment of an apparatus for controlling fuel injection advance angle according to the present invention. In this embodiment, the apparatus 1 for controlling fuel injection advance angle is constructed as an apparatus for controlling a hydraulic type timer 3 mounted on a distribution type fuel injection pump 2 for distributing and supplying fuel to the cylinders of a diesel engine (not shown).

The pressurized fuel in a housing $2_a$ of the fuel injection pump 2 is supplied to the hydraulic type timer 3 through an opening 4 in the hydraulic type timer 3 and is led through a orifice $5_a$ defined in a timer piston 5 into a high pressure chamber 6 to press the timer piston 5 in the left-hand direction in the figure. The timer piston 5 is also biased by a return spring 7 received in a low pressure chamber 8, so that the position of the timer piston 5 is determined by the force of the return spring 7 and the difference in fuel pressure between the high pressure chamber 6 and the low pressure chamber 8. The high pressure chamber 6 is communicated with a fuel tank 9 through a pipe 11 having a solenoid valve 10. The pressure of the fuel in the high pressure chamber 6 can be adjusted by open/close operation of the solenoid valve 10 and it is thus possible to position the timer piston 5 at any desired location.

A roller holder 12 which serves as an injection advance angle adjusting member is connected with the timer piston 5 and the angular position of the roller holder 12 is adjusted depending upon the position of the timer piston 5 to regulate the injection advance angle.

For the purpose of detecting the controlled position of the timer piston 5 at each instant, there is provided a position sensor 13 at the one end portion of the hydraulic type timer 3. The position sensor 13 has a set of coils 14 and 15 provided in parallel and a sensor core 16 which is connected with the timer piston 5 and moves within the set of coils 14 and 15 in accordance with the displacement of the timer piston 5. The set of coils 14 and 15 is connected to a position detecting circuit 17 to form an oscillating circuit and the position detecting circuit 17 produces a position signal $S_1$ whose level varies in accordance with the change in the inductance of the coils 14 and 15 due to the movement of the sensor core 16. The position signal $S_1$ is applied to an adder 18 as a signal indicating the actual position of the timer piston 5, that is, the actual injection advance angle.

To compute the optimum target injection advance angle for the operating condition of the diesel engine at each instant, the apparatus 1 further comprises a first computing circuit 19. A speed data N indicating the rotational speed of the engine, an acceleration data A indicating the amount of operation of an acceleration pedal (not shown) and a coolant temperature data T indicating the temperature of the engine coolant are applied from a sensor unit 20 to the first computing circuit 19 and the optimum injection advance angle for the operating condition of the engine at each instant is computed in the first computing circuit 19 in response to these input data. The computed result is output as a target position signal $S_2$ indicative of the position of the timer piston 5 necessary for obtaining the target injection advance angle.

The above described function of the first computing circuit 19 is realized by the use of a read only memory (ROM). That is, the first computing circuit 19 has a read only memory (ROM) $19_a$ in which data indicating various target positions of the timer piston 5 are stored in advance and the input data N, A and T are applied to the ROM $19_a$ as address data. As a result, the data stored at the address designated by these data N, A and T is read out as data representing the optimum position of the timer piston 5 for the condition of engine operation at that time, and the target position signal $S_2$ is produced on the basis of the read out data.

The data to be stored at each address designated by the data N, A and T as providing the optimum position of the timer piston 5 for the condition represented by the data A, N and T can be determined experimentally.

The structure of the first computing circuit 19 is not limited to that of the above described circuit in which map operation is carried out in response to the data N, A and T to obtain the optimum position of the timer piston 5 for the operating condition of the engine at that time, but may be arranged so that the optimum position of the timer piston 5 is obtained by computation based on the data N, A and T on the basis of a predetermined equation.

The position signal $S_1$ is added to the target position signal $S_2$ in the adder 18 in the polarity shown in the Figure and a command signal $S_3$ showing the deviation of the position signal $S_1$ from the target position signal $S_2$ and its polarity is output. The command signal $S_3$ is applied to a first control signal generator 21 for producing a first control signal $S_4$ for controlling the solenoid valve 10 so as to be closed when the polarity of the deviation shown by the command signal $S_3$ is positive or zero, that is, $S_2 \geq S_1$, and to be opened when the polarity is negative, that is, $S_2 < S_1$. The first control signal $S_4$ is applied as an ON/OFF control signal to the solenoid valve 10 through a switch 22 provided for changing over the mode of injection advance angle control between the closed-loop control mode and the open-loop control mode.

Therefore, when the switch 22 is in the position shown by the solid line, the control operation is carried out by a closed-loop control circuit in response to the target position signal $S_2$ from the first computing circuit 19 and the position signal $S_1$ from the position detecting circuit 17. Thus the solenoid valve 10 is controlled in ON/OFF control mode for the adjustment of the injection advance angle. As a result, the actual injection advance angle is made to coincide with the target injection advance angle.

In general, it is known that an ON/OFF control system will be established if oscillation within a limited cycle width is allowed when the controlled system has a linear lag element and a dead time element. The ON/-OFF control system can be established macroscopically since the injection advance angle adjusting portion of the fuel injection pump is formed by the use of hydraulic pressure, an orifice, the force of a spring and the like. In such an arrangement, it is possible to realize a control operation with better response characteristics and higher reliability than is possible with a PID (Proportional, Integrational and Differential) control system if the size of the orifice and the force of the spring are appropriately set.

However, in this invention the ON/OFF control system described above is not employed when an abnormal state occurs in the position signal $S_1$ used as the feedback signal. To carry out control of the injection advance angle in open-loop control mode in such a condition, there is provided a control circuit 23 for open-loop control. The control circuit 23 has a second computing circuit 24 and a pulse generator 25, and the speed data N, the acceleration data A and the coolant temperature data T are applied to the second computing circuit 24. The optimum injection advance angle for the condition of engine operation at that time is computed by the second computing circuit 24 in response to these input data N, A and T. As in the case of the first computing circuit 19, the second computing circuit 24 may be also constructed by the use of a read only memory for performing the computing operation described above. The resulting output signal $S_6$ is applied to the pulse generator 25 to produce a second control signal $S_5$, which is a pulse signal whose duty cycle varies in response to the output signal $S_6$. The duty cycle of the second control signal $S_5$ required for obtaining the desired injection advance angle can be determined experimentally and the pulse generator 25 produces a second control signal $S_5$ having the duty cycle necessary for obtaining the target injection advance angle shown by the output signal $S_6$. The second control signal $S_5$ is applied through the switch 22 to the solenoid valve 10 when the switch 22 is switched over as shown by broken line. As a result, the solenoid valve 10 is repeadedly closed/opened at short intervals, whereby the average opening degree of the solenoid valve 10 is maintained at a value corresponding to the duty cycle of the second control signal $S_5$ and the injection advance angle is set at the desired value by the hydraulic type timer 3.

Reference numeral 26 designates a trouble detecting circuit for detecting whether or not the condition of the position signal $S_1$ has become abnormal. The trouble detecting circuit 26 discriminates whether or not the level of the position signal $S_1$ is within a predetermined normal range and produces a detection signal $S_7$ whose level becomes high when the level of the position signal $S_1$ is within the normal level range and low when the level is outside of the normal level range. The detection signal $S_7$ is applied as a switching control signal which causes the switch 22 to be switched over as shown by the solid line when the detection signal $S_7$ is at high lever and as shown by the broken line when it is at low level.

According to the construction described above, the solenoid valve 10 is repeatedly closed/opened at short time intervals in accordance with the duty cycle of the second control signal $S_5$ to control the average opening degree of the solenoid valve only when the feedback signal becomes abnormal, while the solenoid valve 10 is controlled in ON/OFF mode in accordance with the result of a comparison of the target injection advance angle and the actual injection advance angle when the feedback signal is in normal condition. As described above, since the solenoid valve 10 is closed or opened in accordance with the sign of the deviation of the actual injection advance angle from the target injection advance angle for normal feedback signal, the number of operations of the solenoid valve 10 is remarkably reduced as compared with the operation in the open-loop control system. Therefore, the service life of the solenoid valve 10 is prolonged.

When an undesired state occurs in the feedback signal, the control system is switched over to the open-loop control system and the solenoid valve is closed/opened repeatedly at short time intervals. However, this closed/opened control state is carried out only for a short period, i.e., only so long as the undesired state of the feedback signal persists, so it has no serious effect on the service life of the solenoid valve.

In the embodiment described above, though the second computing circuit 24 is provided for obtaining the target injection advance angle for the open-loop control mode, as illustrated in the figure by the broken line, the target position signal $S_2$ may be used instead of the output signal $S_6$. In this case, it is possible to omit the second computing circuit 24 so that the circuit structure can be simplified.

We claim:

1. An apparatus for controlling a fuel injection advance angle of a fuel injection pump having a hydraulic type timer with a solenoid valve connected with an injection advance angle adjusting member of said fuel injection pump, said apparatus comprising:
    a first means for generating a first signal showing a target injection advance angle for closed-loop control for the condition of operation of an internal combustion engine associated with said fuel injection pump;
    a second means for generating a feedback signal related to the actual injection advance angle;
    a third means responsive to the first signal and the feedback signal for producing a first control signal for controlling the solenoid valve so as to be in one state of opening or closing when the actual injection advance angle is substantially coincident with the desired target injection advance angle, and to be in the other state of opening or closing when they are not substantially coincident;
    means for generating a second signal showing the target injection advance angle for open-loop control according to the condition of operation of the internal combustion engine;
    means responsive to the second signal for generating a second control signal, which is a pulse signal having a duty cycle determined in accordance with the second signal, for controlling the average opening of the solenoid valve so as to obtain the optimum injection advance angle;
    a detecting means for detecting whether or not the feedback signal is in normal condition; and
    a signal changeover means which is responsive to the result detected by said detecting means and supplies the first control signal to the solenoid valve when the feedback signal is in normal condition and supplies the second control signal to the solenoid valve when the feedback signal is not in the normal condition.

2. The apparatus as claimed in claim 1 wherein said first means has a computing circuit which is responsive to at least one signal indicative of the condition of the operation of the internal combustion engine and generates the first signal on the basis of a computed optimum injection advance for the condition of operation of the internal combustion engine.

3. The apparatus as claimed in claim 2 wherein said computing circuit has a read only memory in which data representing the injection advance angles are stored in advance and one data is read out therefrom in response to the application of the signal indicative of the condition of the operation of the internal combustion engine as address data.

4. The apparatus as claimed in claim 1 wherein said second means is arranged so as to generate the feedback signal in relation to the position of a timer piston of the hydraulic type timer.

5. The apparatus as claimed in claim 4 wherein said second means has a position sensor for detecting the position of the timer piston and a position detecting circuit responsive to a signal from the position sensor to produce a signal indicative of the position of the timer piston as the feedback signal.

6. The apparatus as claimed in claim 5 wherein the position sensor includes sensor coils and a sensor core which is connected with the timer piston and moves relative to the sensor coils in accordance with the displacement of the timer piston, whereby to produce the feedback signal.

7. The apparatus as claimed in claim 1 wherein said third means has a circuit for producing a signal indicating the deviation of the actual injection advance angle from the target injection advance angle in response to the first signal and the feedback signal and a circuit for producing the first control signal in response to the signal indicating the deviation.

8. The apparatus as claimed in claim 7 wherein the solenoid valve is closed or opened in accordance with the sign of the deviation indicated by the deviation signal by the first control signal.

9. An apparatus for controlling a fuel injection advance angle of a fuel injection pump having a hydraulic type timer with a solenoid valve connected with an injection advance angle adjusting member of said fuel injection pump, said apparatus comprising:

a first means for generating a first signal showing a target injection advance angle for the condition of operation of an internal combustion engine associated with said fuel injection pump;

a second means for generating a feedback signal related to the actual injection advance angle;

a third means responsive to the first signal and the feedback signal for producing a first control signal for controlling the solenoid valve so as to be in one state of opening or closing when the actual injection advance angle is substantially coincident with the desired target injection advance angle, and to be in the other state of opening or closing when they are not substantially coincident;

means responsive to the first signal for generating a second control signal, which is a pulse signal having a duty cycle determined in accordance with the first signal, for controlling the average opening of the solenoid valve so as to obtain the optimum injection advance angle;

a detecting means for detecting whether or not the feedback signal is in normal condition; and a signal changeover means which is responsive to the result detected by said detecting means and supplies the first control signal to the solenoid valve when the feedback signal is in normal condition and supplies the second control signal to the solenoid valve when the feedback signal is not in the normal condition.

10. The apparatus as claimed in claim 9 wherein the second control signal is a pulse signal whose duty cycle varies in accordance with the first signal.

* * * * *